June 2, 1953     M. K. BENSON     2,640,309
CUTTER MECHANISM FOR MOWING MACHINES
Filed Aug. 19, 1949
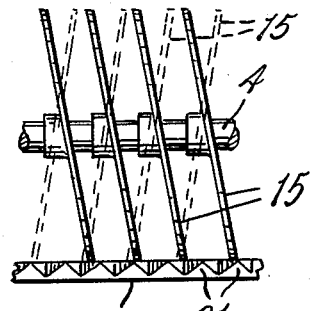
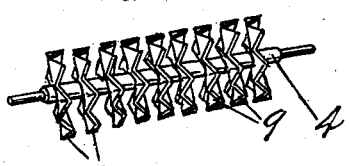
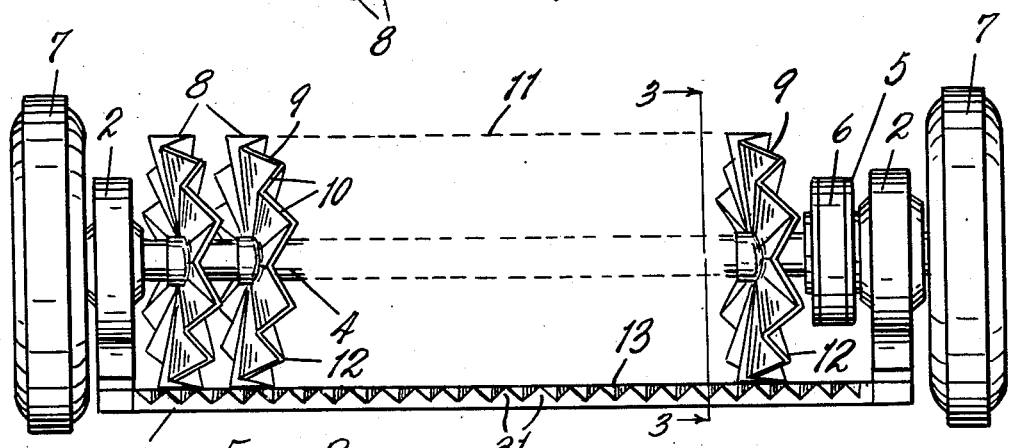
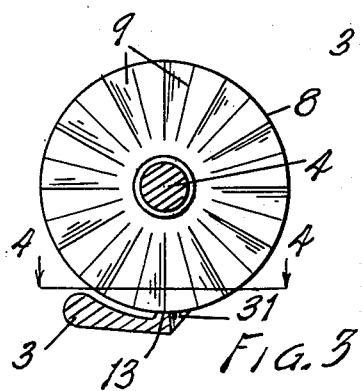
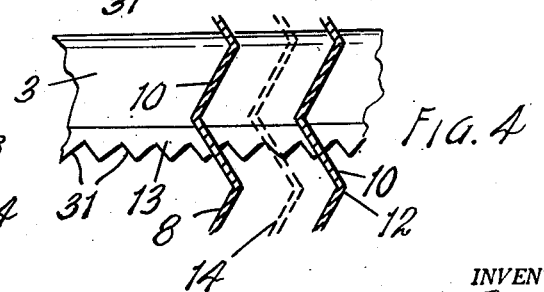
INVENTOR.
Merle K. Benson
BY
Attorney.

Patented June 2, 1953

2,640,309

UNITED STATES PATENT OFFICE 2,640,309

CUTTER MECHANISM FOR MOWING MACHINES

Merle K. Benson, Belmont, Mich.

Application August 19, 1949, Serial No. 111,269

3 Claims. (Cl. 56—294)

This invention relates to improvements in cutter mechanism for mowing machines.

The main objects of this invention are:

First, to provide a cutter mechanism for mowing machines which is well adapted for embodiment in lawn mowers and is effective in cutting tall grass or weeds.

Second, to provide a cutter assembly for mowing machines which may be readily embodied in various types of mowing machines, both hand and motor operated.

Third, to provide a cutter assembly having these advantages which can be economically produced.

Objects relating to details and economies of the invention will appear from the description to follow. The invention is pointed out in the claims.

A preferred embodiment of the invention is illustrated in the accompanying drawings, in which:

Fig. 1 is a perspective view of a mower assembly or cutter embodying my invention.

Fig. 2 is an enlarged fragmentary front elevational view of the cutter assembly of my invention, certain parts being omitted for convenience in illustration.

Fig. 3 is a vertical sectional view on a line corresponding to line 3—3 of Fig. 2.

Fig. 4 is a fragmentary view in horizontal section on a line corresponding to line 4—4 of Fig. 3, the sweep of the cutter blades being indicated by dotted lines.

Fig. 5 is a fragmentary view of a modified form or embodiment of the invention.

In the embodiment of my invention illustrated, 1 designates generally a mowing machine of the power type the frame of which is provided with forwardly projecting frame members 2 carrying the cutter assembly of my invention. The cutter bar 3 is mounted at the forward end of these arms and is provided with forwardly projecting A-shaped teeth 31 forming a continuous serrated edge. The shaft 4 is a driven shaft being provided with a pulley 5 connected by the belt 6 to the motor. Carrying wheels 7 are provided for the forward end of the frame.

The shaft 4 is provided with a plurality of circular axially spaced cutter blades 8 which are mounted on the shaft in spaced relation and in angularly inclined relation relative to the axis of the shaft. These blades have radial inwardly tapering corrugations 9 which result in zigzag cutting edges 10, the cutting edges lying in a cylinder indicated by the dotted lines 11 and the cutter bar. The reaches 12 of the zigzag edges of the cutter blades are of substantial length, the length preferably substantially exceeding the distance between the tips of an adjacent pair of the teeth of the cutter bar as is shown in the drawing.

The upper face 13 of the cutter bar is preferably cylindrically curved to correspond to the peripheral curvature of the cutter blades as is shown in Fig. 3 thus providing an effective shear cut. Due to the angular positioning of the cutter blades relative to the axis of the shaft they sweep longitudinally of the blade on each rotation as is indicated by full lines and the dotted lines 14 in Fig. 4. This results in a very effective shearing action, the reaches of the blades sweeping across the teeth with a shearing action due to the reaches being at an angle to the plane of the blade and also due to the blade being inclined or arranged at an angle to its axis of rotation.

The machines embodying my invention are effective in cutting tall grass and weeds as well as providing an evenly cut surface. The tall grass and weeds are not pushed forwardly by the cutter but the cutter in effect has a reel action drawing the grass and weeds into the cutting relation of the cutter bar and the blades.

In the embodiment of the invention shown in Fig. 5 the blades are in the form of flat disks 15. They are arranged on the shaft 4 in angular relation to the axis thereof and have a sweeping action, as indicated by dotted lines, relative to the cutter bar.

I have illustrated and described my invention in a highly practical embodiment thereof. I have not attempted to show various modifications or adaptations as it is believed this disclosure will enable those skilled in the art to embody or adapt my invention as may be desired.

Having thus described my invention, what I claim as new and desire to secure by Letters Patent is:

1. In a mowing machine, the combination of a cutter bar having a continuous series of forwardly facing A-shaped teeth, a driven cutter shaft, and a plurality of circular axially spaced cutter blades mounted on said shaft in angularly inclined relation to the axis thereof, said blades having radial inwardly tapering corrugations of substantial depth at the peripheries of the blades providing zigzag cutting edges coacting with the cutter bar, the reaches of the zigzag edges of the blades being of a length substantially exceeding the distance between the tips of the teeth of the cutter bar, the angular position of the blades relative to the axis of the shaft also resulting in an axial sweeping movement of the blades relative to the cutter bar.

2. In a mowing machine, the combination of a cutter bar having a continuous series of forwardly facing A-shaped teeth, a driven cutter shaft, and a plurality of circular axially spaced cutter blades mounted on said shaft in angularly inclined relation to the axis thereof, said blades having radial inwardly tapering corrugations of substantial depth at the peripheries of the blades providing zigzag cutting edges coacting with the cutter bar, the reaches of the zigzag edges of the blades being of a length substantially exceeding the distance between the tips of the teeth of the cutter bar.

3. In a mowing machine, the combination of a toothed cutter bar, a driven cutter shaft, and a plurality of circular axially spaced cutter blades mounted on said shaft in an angularly inclined relation to the axis of the shaft providing an axial sweeping movement of the edges of the blades relative to the cutter bar on each rotation of the blades, the blades having radial corrugations providing zigzag cutting edges coacting with the cutter bar, the reaches of the zigzags at the edges of the blades exceeding the distance between the tips of the teeth of the cutter bar.

MERLE K. BENSON.

References Cited in the file of this patent

UNITED STATES PATENTS

| Number | Name | Date |
|---|---|---|
| 188,788 | Farnum | Mar. 27, 1877 |
| 221,640 | Whitcomb | Nov. 11, 1879 |
| 255,688 | Spottswood | Mar. 28, 1882 |
| 503,509 | Wansbrough | Aug. 15, 1893 |
| 1,637,603 | Christensen | Aug. 2, 1927 |
| 2,063,067 | Waller | Dec. 8, 1936 |
| 2,282,238 | Newton | May 5, 1942 |
| 2,484,071 | Brauer | Oct. 11, 1949 |